(12) United States Patent
Wan et al.

(10) Patent No.: US 9,217,069 B2
(45) Date of Patent: Dec. 22, 2015

(54) HYDROPHOBIC COATING COMPOSITION AND METHOD OF IMPARTING HYDROPHOBICITY ONTO A SURFACE

(71) Applicant: Nano and Advanced Materials Institute Limited, Hong Kong (HK)

(72) Inventors: Kai Tai Wan, Hong Kong (HK); Su Ping Bao, Hong Kong (HK); Hong Gang Zhu, Hong Kong (HK); Ran Yuan Wang, Hong Kong (HK); Bin Meng Chen, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 0 days.

(21) Appl. No.: 14/296,431

(22) Filed: Jun. 4, 2014

(65) Prior Publication Data

US 2015/0140222 A1    May 21, 2015

Related U.S. Application Data

(60) Provisional application No. 61/962,853, filed on Nov. 18, 2013.

(51) Int. Cl.
| C04B 41/49 | (2006.01) |
| C08K 5/05 | (2006.01) |
| C09D 143/04 | (2006.01) |
| C08K 5/5419 | (2006.01) |
| C08K 3/22 | (2006.01) |
| C08K 3/36 | (2006.01) |
| C04B 41/00 | (2006.01) |
| C04B 41/64 | (2006.01) |

(52) U.S. Cl.
CPC ............ *C08K 5/05* (2013.01); *C04B 41/009* (2013.01); *C04B 41/4922* (2013.01); *C04B 41/64* (2013.01); *C08K 3/22* (2013.01); *C08K 3/36* (2013.01); *C08K 5/5419* (2013.01); *C09D 143/04* (2013.01); *C08K 2003/2241* (2013.01)

(58) Field of Classification Search
USPC ................................ 524/544, 588; 427/393.6
See application file for complete search history.

(56) References Cited

U.S. PATENT DOCUMENTS

| 4,716,051 A | 12/1987 | Rodder |
| 5,032,641 A * | 7/1991 | Nanishi et al. ................ 524/544 |

(Continued)

OTHER PUBLICATIONS

Ibrahim,M.; Al-Gahtani, A.S.; Maslehuddin, M.; Almusallam, A.A., Effectiveness of concrete surface treatment materials in reducing chloride-induced reinforcement corrosion, Construction and Building Materials, Oct. 1997, pp. 443-451, vol. 11, No. 7, Elsevier.

(Continued)

*Primary Examiner* — Vu A Nguyen
(74) *Attorney, Agent, or Firm* — Ella Cheong Hong Kong; Sam T. Yip

(57) ABSTRACT

The present invention relates to a method of producing a water repelling surface or imparting hydrophobicity onto a surface comprises applying a polymer-based coating composition. The water repelling surface or the hydrophobic surface imparted by the present method has at least 90° of water contact angle. The water repelling surface or the hydrophobic surface imparted by the present method is preferably on a concrete surface. The present method imparts hydrophobicity onto surfaces that are durable without an additional primer layer between the surfaces and the coating composition.

20 Claims, 4 Drawing Sheets

(56) References Cited

U.S. PATENT DOCUMENTS 6,037,429 A * 3/2000 Linert et al. .................. 526/243
7,482,420 B2   1/2009 Porsch et al.
8,029,854 B2  10/2011 Johnston

OTHER PUBLICATIONS

Yang, C. C.; Wang, L. C.; Weng, T. L., Using charge passed and total chloride content to assess the effect of penetrating silane sealer on the transport properties of concrete, Mater. Chem. Phys, May 15, 2004, pp. 238-244, vol. 85, Issue 1, Elsevier.

* cited by examiner

HYDROPHOBIC COATING COMPOSITION AND METHOD OF IMPARTING HYDROPHOBICITY ONTO A SURFACE

CROSS-REFERENCE TO RELATED APPLICATIONS

This application claims the benefit of U.S. Provisional Patent Application No. 61/962,853 filed on Nov. 18, 2013, the disclosure of which is incorporated by reference herein.

FIELD OF INVENTION

The present invention relates to methods of producing a hydrophobic surface and a coating composition for imparting hydrophobicity to a surface. In particular, the surface to which hydrophobicity is imparted is a concrete surface.

BACKGROUND OF INVENTION

Numerous researches have been carried out on concrete surface treatments in order to prevent the entrance of corrosive agents and moisture into concrete by imparting hydrophobicity to the concrete surface. Existing concrete surface treatments are largely divided into three approaches. The first existing concrete surface treatment approach is the use of hydrophobic pore liner that imparts hydrophobicity onto concrete surface. The second approach relies on pore blockers to block concrete pores. The pore blockers react with constituents in the concrete and forms insoluble products within the pores. The third is to apply a dense layer of high water resistance film onto the concrete surface. It has been found that treating concrete surface with one of the approaches alone does not give satisfactory results. For instance, pore liner modified concrete surfaces are found to be fragile without further protective means and can be washed off by water easily. In addition, pore liner has not been found effective in blocking water vapor and other gaseous corrosive agents, such as carbon dioxide. Pore blocking agents have similar problems. Although pore blockers can reduce water penetration, pore blockers penetrate into concrete porous surface less than pore liner, and pore blocker treated surfaces remain prone to carbon dioxide and other gaseous corrosive agents. Film-forming coats, very often, fail to be compatible with the concrete surface. Adhesion between existing polymeric coating with high water resistance and concrete has found to be weak and cannot withstand differential thermal expansion and contraction cycles of the concrete surfaces. The common solution to the above problems is to apply an additional primer layer as an interfacial enhancer between the concrete layer and the hydrophobicity treatment. However, application of the primer layer is time-consuming and expensive.

Silane is a well known surface coupling agent that can easily penetrate into concrete due to its inherent special chemical structures. Over the past 20 years, researchers have utilized silanes successfully to impregnate the concrete in depth. U.S. Pat. No. 4,716,051 discloses that the silane molecules can penetrate inside the concrete deeply by the use of alkyl trialkoxysilanes. In recent years, researchers have leveraged the reactivity of silane with suitable functional groups to polymerize with various monomers so as to form special polymer-based coating as silane-terminated polymer sealer on concrete. The incorporation of polymer groups combines the unique physical or chemical properties of polymer components and the inherent multifunctional properties of silane. Porsche et al. in U.S. Pat. No. 7,482,420 reports a method for making a silane-terminated polyurethane composition with high strength and high elongation. In U.S. Pat. No. 8,029,854, Johnston discloses a process for repairing concrete by using a silane-terminated pre-polymer polyurethane sealant. However, these coatings are associated with several disadvantages. Besides their complicated fabrication process, the silane-based polyurethane sealant is prone to react with water or moisture in concrete, leading to the expansion of coating.

Therefore, there is a need to provide a hydrophobicity surface treatment for concrete which is durable, effective in blocking water vapor and other gaseous corrosive agents without an additional application of primer layer and inert to water or moisture in concrete, in order to overcome the existing problems associated with conventional concrete surface treatment methods.

Citation or identification of any reference in this section or any other section of this application shall not be construed as an admission that such reference is available as prior art for the present application.

SUMMARY OF INVENTION

The first aspect of the present invention relates to method of producing a water repelling surface or imparting hydrophobicity onto a surface comprises applying a polymer-based coating composition. The water repelling surface or the hydrophobic surface imparted has at least 90° of water contact angle.

The present method produces a water repelling surface or imparts hydrophobicity on a concrete surface. Unlike conventional hydrophobic surface treatment methods, the present method imparts hydrophobicity onto surfaces that is durable, and resistant to water as well as gaseous agents without an additional primer layer between the surfaces and the coating composition.

Another aspect of the present invention relates to a coating composition for imparting hydrophobicity onto a surface. In particular, the present coating composition imparts hydrophobicity onto a surface without an additional primer layer in between the surface and the coating composition. The surface having been coated with the present coating composition has at least 90° water contact angle. The surface being coated is a concrete surface.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF INVENTION

The above and other objects and features of the present invention will become apparent from the following description of the invention, when taken in conjunction with the accompanying drawings, in which.

DETAILED DESCRIPTION OF INVENTION

The present invention is not to be limited in scope by any of the specific embodiments described herein. The following embodiments are presented for exemplification only.

Figure 1:
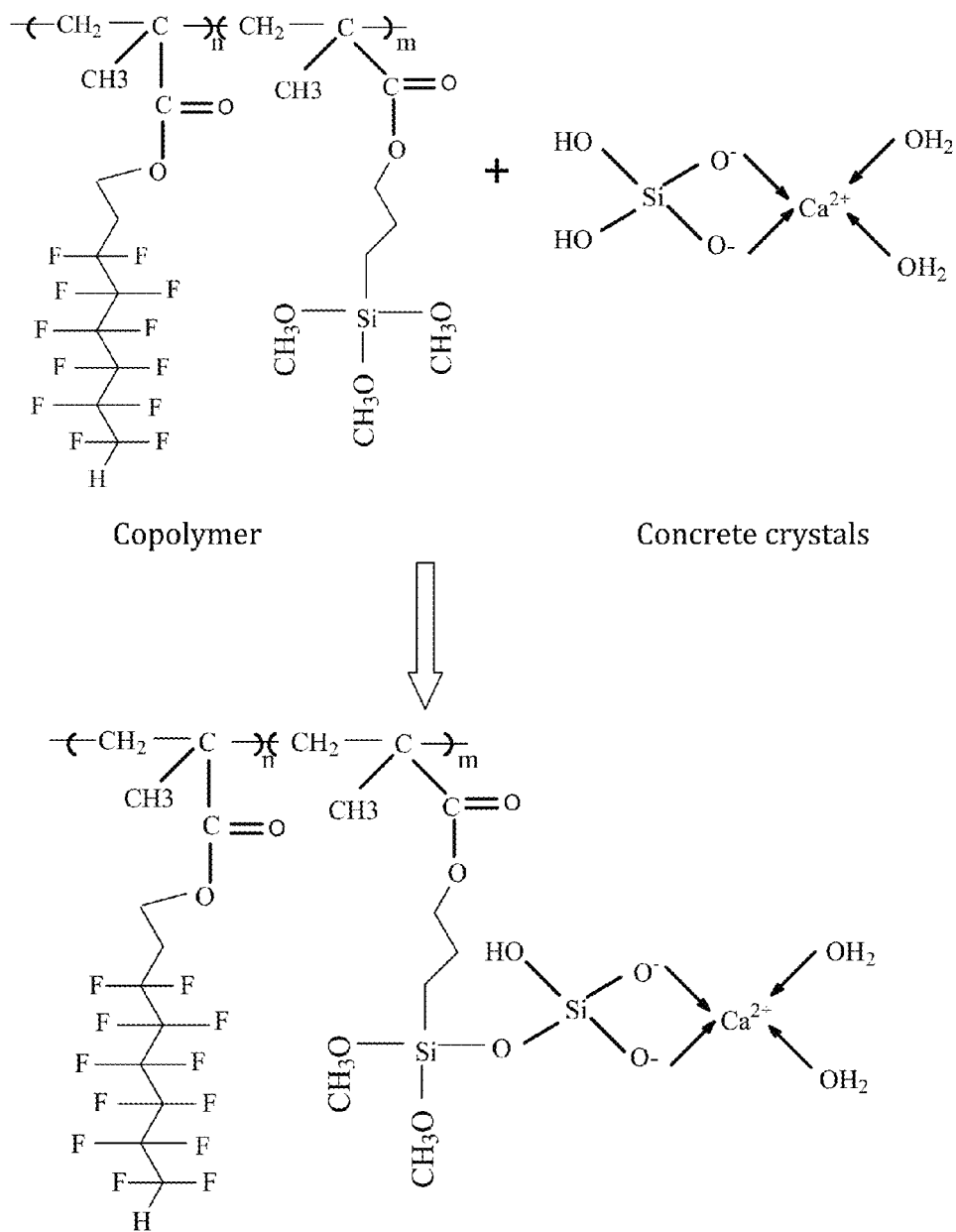
FIG. 1 shows how the copolymer of the present polymer-based coating composition condenses with concrete crystals leading to strong adhesion.

The present invention provides a method of producing a water repelling surface or imparting hydrophobicity onto a surface. The method comprises providing one or more types of trialkoxysilane and one or more types of monomer that is able to polymerize with said trialkoxysilane, treating said trialkoxysilane and monomer at 80° C. to 85° C. under nitrogen condition to form an oxysilane-polyfluorinated copolymer, cooling said copolymer to room temperature, formulating a polymer-based coating composition from said copolymer and applying said polymer-based coating composition onto the surface. The polymer-based coating composition of the present invention can be applied by conventional techniques as readily known by one skilled in the art. Said applying step may be conventional spray coating, brushing, dipping, roller coating, flow coating or the like. The water repelling surface produced or the hydrophobic surface imparted by the present method is durable from washing and has at least 90° of water contact angle. In one embodiment, the water contact angle of the hydrophobic surface imparted by the present invention is greater than 100°. Unlike conventional hydrophobic surface treatment methods, the present method imparts hydrophobicity onto surfaces that are durable and effective in blocking water as well as other gaseous agent and inert towards moisture without an additional primer layer between the surfaces. The present hydrophobicity surface modification treatment method significantly reduces the cost and processing time of the surface treatment. In one embodiment, the present method produces a water repelling surface or imparts hydrophobicity on a concrete surface. The polymer-based coating composition of the present invention exhibits strong adherence to concrete surfaces by forming covalent bonds with silanol group (Si—OH) in concrete (FIG. 1). This strong adherence of the polymer-based coating composition of the present invention solves the durability issues associated in many conventional concrete surface modification coats. The present method provides durable hydrophobic coat on surfaces which is also capable of withstanding the thermal expansion and contraction cycle of the surface. In addition to forming a hydrophobic coat on the surface being coated therewith, the polymer-based coating composition of the present invention is capable of penetrating into the porous concrete surface at least 5 mm depth below the concrete surface, leading to effective blockage of water vapor and other gaseous corrosive agents that can penetrate into the concrete surface.

The present invention also provides a coating composition for imparting hydrophobicity onto a surface. The present coating composition is the durable polymer-based coating composition which can strongly adhere to the surface being coated to impart hydrophobicity without prior application of an additional primer layer on the surface of concerned as required by existing hydrophobic surface modification coats. The coating composition comprises an oxysilane-polyfluorinated copolymer form by a polymerization reaction between a trialkoxysilane and a monomer. The surface having been coated with the present coating composition has at least 90° water contact angle. In one embodiment, the surface having been treated with the present coating composition has water contact angle of greater than 100°.

In one embodiment, polymerization of the trialkoxysilane and monomer is performed in the presence of an initiator. The initiator is less than 1 wt % of the polymerization reaction mixture. One skilled in the art would readily appreciate an initiator suitable for the polymerization of trialkoxysilane and monomer for the subject invention. Examples of initiator suitable for the polymerization for the present invention include, but are not limited to benzoyl peroxide, dicumyl peroxide and tert-butyl peroxide.

Below is a schematic representation of the trialkoxysilane of the present invention:

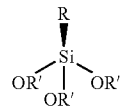

The alkoxy group (—OR') of the trialkoxysilane of the present invention may be any aliphatic, aromatic or cycloaliphatic alkoxy group as appreciated by one skilled in the art. The R group can be an aliphatic, aromatic, or cycloaliphatic group. The R group must be hydrophobic functional group and has an alkene-terminated group which comprises at least one reactive carbon double bond in order to form an oxysilane-polyfluorinated copolymer with the monomer. In certain embodiment, the trialkoxysilane for forming the copolymer of the polymer-based coating composition of the present invention is trimethoxysilyl propyl methacrylate (TPM), isobutyltriethoxysilane, 3(triethoxysilyl)propyl methacrylate or a combination thereof.

Below shows chemical structures of trimethoxysilyl propyl methacrylate (Formula I) and 3-(triethoxysilyl)propyl methacrylate (Formula II). Two examples of trialkoxysilane having a reactive functional group with alkene terminated group with at least one double bond are given in Formula I and Formula II.

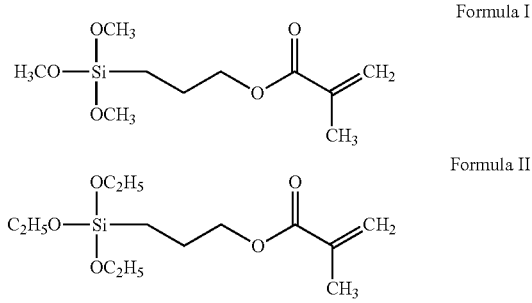

The silane can enable the treated surface to repel entrance of water and thereby impart a water-proof ability onto the treated surface. No catalyst is needed during application of the polymer-based coating composition of the present invention as the hydroxide anions of silanol group (Si—OH) in concrete condenses with the OR' group from the trialkoxysilane of the copolymer in the polymer-based coating composition, leading to a strong covalent bond between the coat and concrete surface.

The monomer of the present invention is an alkene-terminated polyfluorinated compound having at least one reactive carbon double bond for forming an oxysilane-polyfluorinated copolymer with the trialkoxysilane. The fluorinated monomer of the present invention is, but is not limited to, 2,2,3,3,4,4,5,5,6,6,7,7-dodecafluoroheptyl methacrylate (DMA), 2(perfluorohexyl)ethyl methacrylate or a combination thereof.

Below shows chemical structures of 2,2,3,3,4,4,5,5,6,6,7,7-dodecafluoroheptyl methacrylate (Formula III) and 2-(perfluorohexyl)ethyl methacrylate (Formula IV). Two examples of fluorinated monomer having at least one double bond are given in Formula III and Formula IV:

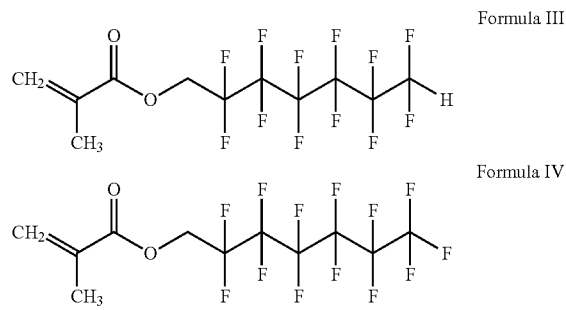

In one embodiment, the weight ratio of the trialkoxysilane and fluorinated monomer is between 1:2 and 2:1, In another embodiment, solvent is added to the copolymer to form a homogenous solution of the polymer-based coating composition. Solvent may be used in the present invention include, but are not limited to, ethanol, tetrahydrofuran, dimethylformamide, isobutyltriethoxysilane, or a combination thereof. In certain embodiment, the present method further comprises forming a filler dispersion by dispersing one or more types of inorganic fillers in the solvent under ultrasonic mixing. The filler dispersion is added to the copolymer to form the polymer-based coating composition. In one embodiment, the polymer-based coating composition comprises the filler dispersion is subject to a heat treatment at 80° C.-85° C. for approximately an hour before cooling the coating composition to room temperature. The one or more types of inorganic fillers includes, but are not limited to, titanium dioxide, silicon dioxide, mica, silica fumes, talc and kaolin. The weight percentage of inorganic filler ranges from 0.1 to 20 wt % of the polymer-based coating composition. In one embodiment, the inorganic filler is 10 wt % of the polymer-based coating composition. Inorganic filler in the coating composition of the present invention functions to modify the viscosity, appearance and functionalities to the coating composition. For example, titanium dioxide is added as inorganic filler to give a white coating. Aluminum hydroxide is flame retardant filler which can be added to the present coating composition to improve flame retardancy of the coating. Clay, a low cost material, can also be pretreated for use as suitable filler in the present invention.

Figure 4:
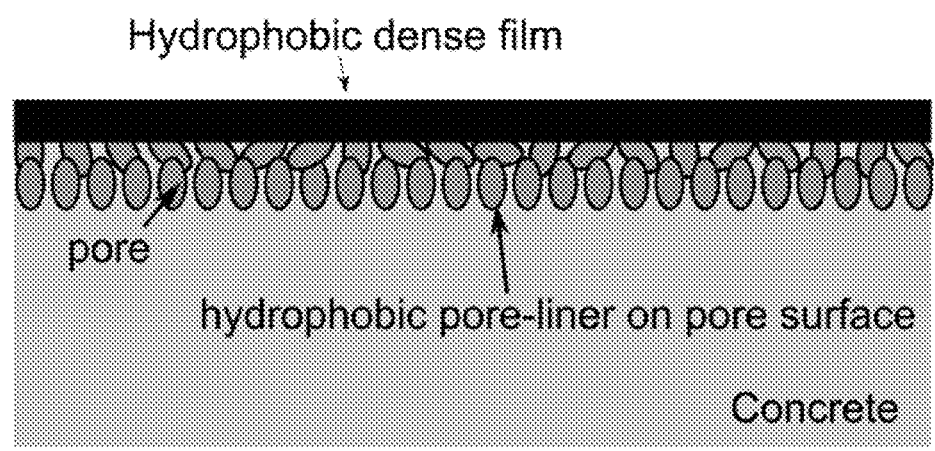
FIG. 4 shows one embodiment of the present invention where the present polymer-based coating composition comprises a second silane-containing compound.

In yet another embodiment, the present method further comprises adding one or more a second silane-containing compounds having good concrete penetration to the polymer-based coating composition. Said second silane-containing compounds are able to penetrate into porous concrete surface with sufficient depth without the help of an additional solvent. The oxysilane-polyfluorinated copolymer may dissolve into the second silane-containing compounds. The second silane-containing compounds used in the present invention include alkyl trialkoxysilanes having alkyl groups of 3 to 8 carbon atoms and alkoxyl groups of 3 or 4 carbon atoms. U.S. Pat. No. 4,716,051 describes silane compounds that can penetrate into porous concrete surfaces, and disclosures thereof are incorporated herein by reference in its entirety. The second silane-containing compounds used in the present invention further enhance the hydrophobic performance of the present coating composition on concrete surface as well as penetration of the coating into porous zones of the concrete. In one embodiment, one of the second silane-containing compounds is isobutyltriethoxysilane. FIG. 4 is a schematic diagram illustrating the embodiment of the present polymer-based coating composition having said one or more second silane-containing compounds. As seen in FIG. 4, the present polymer-based coating composition forms a dense film on the concrete surface and at the same time the second silane-containing compound diffuses into concrete pores, forming a hydrophobic pore-liner within the concrete pores.

EXAMPLES

Polymer-based coating composition A and B are prepared in accordance with the present invention. Coating composition A comprises a copolymer formed from polymerization reaction of TPM and DMA in a ratio of 1:1, and 1 wt % of hydrophobic titanium dioxide particles dispersed in ethanol.

Polymer-based coating composition B comprises a copolymer formed from polymerization reaction of TPM and DMA in a ration of 1:2, and 0.1 wt % of silicon dioxide dispersed in ethanol.

Figure 2:
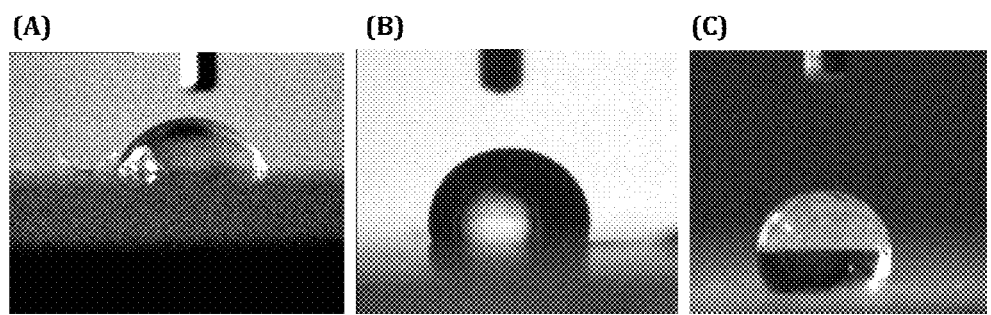
FIG. 2 shows hydrophobicity test using 2 μl water droplet onto untreated concrete surface (A), concrete surface treated with composition A (B) and concrete surface treated with composition B (C).

Water contact angle of concrete surfaces having been treated with compositions A and B are measured and compared with untreated concrete surfaces. Untreated concrete surface has a water contact angle of about 30° (FIG. 2 (A)). Dramatic increase in water contact angle is observed on concrete surfaces having treated with Compositions A and B. Water contact angles greater than 90° are observed for concrete surfaces coated with Compositions A and B, as shown in FIG. 2 (B) and FIG. 2 (C).

Figure 3:
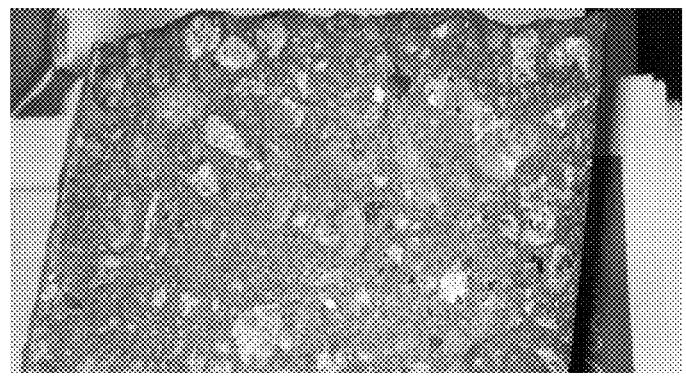
FIG. 3 shows results of carbonation resistance test on concrete surface having treated with polymer-based coating composition of the present invention (A) and untreated concrete surface (B).
Figure 3:
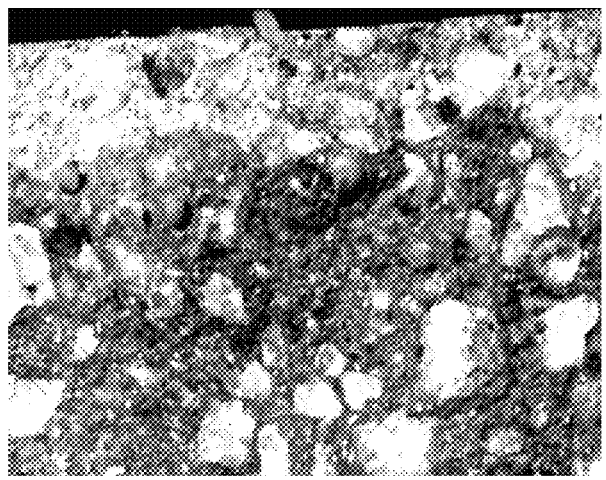
Figure 3:
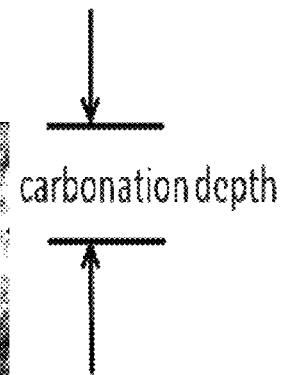

Existing concrete surface modification methods fail to protect concrete from carbon dioxide. Carbonation resistance of the present polymer-based coating composition is examined by conditioning concrete having been treated with the present polymer-based coating composition in an atmosphere of 20 vol % carbon dioxide for a pre-determined period. Degree of carbonation of concrete can then be estimated by splitting the conditioned concrete by spraying 1% phenolphthalein in alcohol onto the split concrete surface and observing the color change of 1% phenolphthalein in alcohol. Phenolphthalein is colorless where concrete carbonation occurs. Phenolphthalein appears pink where there is negligible concrete carbonation. Two concrete blocks, one having been coated with the present polymer-based coating composition and one is untreated, are split through vertically and 1% phenolphthalein in alcohol is sprayed on the split surface of the concrete. Phenolphthalein is pink throughout the concrete block having been treated with the present coating composition (FIG. 3 (A)). On the other hand, 15-20 mm of carbonation is observed in the untreated concrete block in which phenolphthalein appears colorless, indicating the presence of carbon dioxide (FIG. 3 (B)).

The above examples demonstrates the present invention provides a hydrophobicity surface treatment method and coating composition for concrete which is durable, effective in blocking water and gaseous corrosive agents without an additional application of primer layer overcoming the existing problems associated with conventional concrete surface treatment methods.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the remainder of the disclosure in any way whatsoever. Without further elaboration, it is believed that one skilled in the art can, based on the description herein, utilize the present invention to its fullest extent. All publications recited herein are hereby incorporated by reference in their entirety.

What is claimed is:

1. A method of producing a water repelling surface having a water contact angle of at least 90° on a concrete surface without a primer layer, the method comprising
   providing one or more types of trialkoxysilane having at least one hydrophobic functional group with an alkene terminated group, one or more types of alkene-terminated polyfluorinated monomer that forms an oxysilane-polyfluorinated copolymer with said trialkoxysilane and an initiator for polymerization of said trialkoxysilane and said monomer,
   treating said trialkoxysilane, monomer and initiator at 80-85° C. under nitrogen to form the copolymer,
   formulating a polymer-based coating composition from said copolymer,
   dispersing one or more types of inorganic fillers in a solvent under ultrasonic mixing to form a filler dispersion,
   adding said filler dispersion to the polymer-based coating composition, and further treating the filler dispersion containing- polymer based composition at 80-85° C.,
   cooling said polymer-based coating composition to room temperature, and
   applying said polymer-based coating composition to said concrete surface.

2. The method of claim 1, further comprising adding a solvent to said copolymer to formulate the polymer-based coating composition.

3. A method of producing a water repelling surface having a water contact angle of at least 90° on a concrete surface without a primer layer, the method comprising
   providing one or more types of trialkoxysilane having at least one hydrophobic functional group with an alkene terminated group, one or more types of alkene-terminated polyfluorinated monomer that forms an oxysilane-polyfluorinated copolymer with said trialkoxysilane and an initiator for polymerization of said trialkoxysilane and said monomer,
   treating said trialkoxysilane, monomer and initiator at 80-85° C. under nitrogen to form the copolymer,
   formulating a polymer-based coating composition from said copolymer,
   adding one or more silane-containing compounds having concrete penetration capability of more than 5 mm of concrete to the polymer-based coating composition,
   cooling said polymer-based coating composition to room temperature, and
   applying said polymer-based coating composition to said concrete surface.

4. The method of claim 3, wherein said one or more silane-containing compounds having concrete penetration capability of more than 5 mm of concrete comprise alkyltrialkoxysilane having C3-C8 alkyl groups and C3 or C4 alkoxyl groups.

5. The method of claim 1, wherein the trialkoxysilane and monomer are in a weight ratio from 1:2 to 2:1.

6. The method of claim 1, wherein the initiator is less than 1 wt % of the polymer-based coating composition.

7. The method of claim 1, wherein the inorganic filler is 0.1-20 wt % of the polymer-based coating composition.

8. The method of claim 1, wherein the trialkoxysilane is trimethoxysilyl propyl methacrylate[] or 3-(triethoxysilyl) propyl methacrylate; the monomer is 2,2,3,3,4,4,5,5,6,6,7,7-dodecafluoroheptyl methacrylate or 2-(perfluorohexyl)ethyl methacrylate; and the initiator is benzoyl peroxide.

9. The method of claim 1, wherein the solvent comprises ethanol, tetrahydrofuran or dimethylformamide, and the inorganic fillers comprise titanium dioxide, silicon dioxide, mica, silica fumes, talc, kaolin or a combination thereof.

10. A method of producing a water repelling surface having a water contact angle of at least 90° on a concrete surface without a primer layer, the method comprising
    providing one or more types of trialkoxysilane having at least one hydrophobic functional group with an alkene terminated group, one or more types of alkene-terminated polyfluorinated monomer that forms an oxysilane-polyfluorinated copolymer with said trialkoxysilane and an initiator for polymerization of said trialkoxysilane and said monomer,
    treating said trialkoxysilane, monomer and initiator at 80-85° C. under nitrogen to form the copolymer,
    adding a solvent to said copolymer, wherein the solvent comprises ethanol, tetrahydrofuran or dimethylformamide,
    formulating a polymer-based coating composition from said copolymer,
    cooling said polymer-based coating composition to room temperature, and
    applying said polymer-based coating composition to said concrete surface.

11. The method of claim 1, wherein the water repelling surface produced has a water contact angle of greater than 100°.

12. The method of claim 3, further comprising dispersing one or more types of inorganic fillers in a solvent under ultrasonic mixing to form a filler dispersion, adding said filler dispersion to the polymer-based coating composition, and further treating the filler dispersion containing- polymer based composition at 80-85° C.

13. The method of claim 3, wherein the trialkoxysilane and monomer are in a weight ratio from 1:2 to 2:1.

14. The method of claim 3, wherein the initiator is less than 1 wt % of the polymer-based coating composition.

15. The method of claim 12, wherein the inorganic filler is 0.1-20 wt % of the polymer-based coating composition.

16. The method of claim 3, wherein the trialkoxysilane is trimethoxysilyl propyl methacrylate or 3-(triethoxysilyl)propyl methacrylate; the monomer is 2,2,3,3,4,4,5,5,6,6,7,7-dodecafluoroheptyl methacrylate or 2-(perfluorohexyl)ethyl methacrylate; and the initiator is benzoyl peroxide.

17. The method of claim 12, wherein the solvent comprises ethanol, tetrahydrofuran or dimethylformamide, and the inorganic fillers comprise titanium dioxide, silicon dioxide, mica, silica fumes, talc, kaolin or a combination thereof.

18. The method of claim 3, further comprising adding a solvent to said copolymer, wherein the solvent comprises ethanol, tetrahydrofuran or dimethylformamide.

19. The method of claim 10, further comprising dispersing one or more types of inorganic fillers in a solvent under ultrasonic mixing to form a filler dispersion, adding said filler dispersion to the polymer-based coating composition, and further treating the filler dispersion containing- polymer based composition at 80-85° C.

20. The method of claim 10, further comprising adding one or more silane-containing compounds having concrete penetration capability of more than 5 mm in concete to the polymer-based coating composition.

* * * * *